United States Patent [19]

Voss et al.

[11] 3,724,433

[45] Apr. 3, 1973

[54] ENGINE GOVERNOR SYSTEM WITH SIGNAL-LOSS PROTECTION AND CONTROLLED OSCILLATOR CIRCUIT SUITABLE FOR USE THEREIN

[75] Inventors: James R. Voss, Wilbraham; William R. Ferry, Agawam, both of Mass.

[73] Assignee: Ambac Industries, Incorporated, Springfield, Mass.

[22] Filed: Aug. 13, 1971

[21] Appl. No.: 171,504

[52] U.S. Cl. ....................123/102, 123/139 E
[51] Int. Cl. ....................F02d 11/10
[58] Field of Search ...123/139 E, 102, 140 R; 317/5; 331/143, 172, 111

[56] References Cited

UNITED STATES PATENTS

| | | | |
|---|---|---|---|
| 2,975,408 | 3/1961 | Merel | 331/172 |
| 3,346,771 | 10/1967 | Sutton | 317/5 |
| 3,401,274 | 9/1968 | Marsh | 331/172 |
| 3,486,133 | 12/1969 | James | 331/143 |
| 3,525,017 | 8/1970 | Rosenberg et al. | 123/102 X |
| 3,651,460 | 3/1972 | Gebelein, Jr. | 123/102 X |

*Primary Examiner*—Laurence M. Goodridge
*Attorney*—Howson & Howson

[57] ABSTRACT

A controlled oscillator circuit which, in the absence of an input alternating signal, operates in a free-running manner to produce square-wave output signals at a predetermined frequency, and which responds to input alternating signals of a lower frequency to produce output square-waves at said lower frequency. When used in an engine-speed control system, the input alternating signal is a pickup signal representative of engine speed, and the square-wave output is applied to a phase-locked-loop type of frequency detector, the output of which varies the fuel control for the engine in the sense to accomplish the desired control. Should a loss of input alternating signal from the engine pickup device occur while the engine is operating, the controlled oscillator will nevertheless produce output square waves at a relatively high frequency to operate the frequency detector and reduce the engine power or completely shut it down, thereby avoiding erratic operation or "runaway" of the engine should the input alternating signal disappear. The controlled oscillator circuit preferably comprises a differential operational amplifier having a relatively long time-constant negative-feedback circuit and a relatively short time-constant positive feedback circuit providing two alternate astable states for producing square waves during free running, the input alternating signal being applied to a control input electrode of the operational amplifier to cause it to stay in each of its alternate astable states for a time equal to about one-half cycle of the input wave and to operate in synchronism with the input alternating signal.

9 Claims, 5 Drawing Figures

PATENTED APR 3 1973 3,724,433

ENGINE GOVERNOR SYSTEM WITH SIGNAL-LOSS PROTECTION AND CONTROLLED OSCILLATOR CIRCUIT SUITABLE FOR USE THEREIN

BACKGROUND OF THE INVENTION

Systems are known in which a signal utilization device responds normally to an alternating signal supplied thereto when the alternating signal is in a predetermined frequency range and of at least a predetermined minimum magnitude, which responds in a harmful or potentially harmful way when the signal is below said minimum magnitude, and which responds in an abnormal but harmless or safe manner when the alternating signal is above said frequency range. One type of such a system with reference to which the invention will be described with particularity is a system for controlling the speed of operation of a mechanism, for example an engine-speed governor.

Electrical circuits have been used widely to control the speed of operation of mechanisms such as an engine. As an example, engine speed governor systems are known in the prior art in which an alternating signal having a frequency representative of engine speed is utilized to control a closed-loop servo feedback system for automatically controlling the engine speed to maintain it at or near a desired value. In one known form of such system, the alternating signal representative of engine speed is applied to a frequency detector which senses departures of the signal frequency from the frequency corresponding to the desired engine speed and provides a control signal for operating the engine fuel control in the direction to oppose such departures from the desired speed. In one advantageous form of such a system, the frequency detector comprises a phase detector which compares the phase of the alternating signal with that of a signal from another source to produce an output control voltage. In one usual form of such an arrangement, to operate accurately the phase detector should be supplied with a pulse-type signal having a time-phase accurately representing the phase of the alternating signal. However, the alternating signal derived by the usual pickup device is normally not in such pulse form, but instead is of generally sinusoidal form, may vary from cycle to cycle in amplitude, particularly at different frequencies thereof, may contain irregularities within each cycle due to its own internal operating characteristics, and often is accompanied by spurious interferring signals superimposed thereon and generally designated as "noise."

It is known to derive a suitable input signal for the frequency-detecting circuit by amplifying and clipping, squaring, or shaping the irregular alternating signal from the pickup device. While such an arrangement works well under ordinary conditions, should the alternating signal from the pickup device disappear or be reduced greatly in magnitude while the engine is running, severe difficulties may ensue. Such disappearance of the alternating signal may occur, for example, due to a failure in the pickup device or in the leads connecting it to the pulse clipping circuit. Such a failure will not only prevent proper speed control, but in some cases may result in harmful or even destructive excessive speeding-up or "runaway" of the engine. This normally occurs, for example, in engine-speed governors because the lower the rate of recurrence of the alternating signal the more the governor increases the engine power, so that in the complete absence of the alternating signal the engine is speeded up to the maximum extent by the operation of the governor system.

It is also known to provide special additional circuitry for sensing the presence of an adequate magnitude of the alternating signal representing engine speed, and to produce therefrom a signal which will shut down the engine should the alternating signal fail. However, such an arrangement requires additional special circuitry not only for the sensing function, but also for accomplishing shutdown of the engine.

Accordingly, it is an object of the invention to provide a new and useful fail-safe system.

Another object is to provide a new and useful engine speed control system.

Another object is to provide an engine-speed governing system in which the danger of "runaway," or excessive engine speed, is prevented despite failures in certain portions of the system.

It is also an object to provide such a system in which the engine speed is normally controlled in response to an alternating signal representative of engine speed, and in which protection is provided against undesired effects which may occur should the alternating signal disappear or become drastically reduced in magnitude.

It is also an object to provide such a system in which the circuit for providing protection against failure of the alternating signal also provides accurate and reliable pulse shaping to produce a rectangular or square wave, despite substantial variations in the shape of the alternating signal waveform and despite the presence of substantial amounts of electrical noise superimposed upon the alternating signal.

Another object is to provide such a system in which the circuit providing such protection against loss of alternating signal representing engine speed is inexpensive, compact and reliable.

It is also an object of the invention to provide a controlled oscillator circuit having a free-running condition in which it produces square waves of a predetermined frequency, and which is responsive to an alternating signal of lower frequency to produce an output signal at said lower frequency.

Another object is to provide such a controlled oscillator circuit in which said output signal of lower frequency is a rectangular or square wave even though said alternating signal is not.

A further object is to provide such a controlled oscillator circuit which is inexpensive, compact and reliable.

SUMMARY OF THE INVENTION

In accordance with the invention, these and other objects are achieved by the provision of an electrical system comprising: a source of an alternating signal having a frequency within a predetermined range and normally having at least a predetermined minimum magnitude; signal utilization means; and controlled oscillator means connected between said source and said signal utilization means to supply signals to said signal utilization means; said controlled oscillator means operating as a free-running oscillator at a frequency above said range when said alternating signal is of less than said predetermined minimum magnitude, and responsive to said alternating signal from said source when of at least said minimum magnitude to inhibit said free-running oscillations and to supply said signal utilization means with signals of the same frequency as that of said alternating signal from said source.

In the preferred embodiment, the source of alternating signal comprises means for producing a signal varying with the speed of a mechanism such as an engine, and the signal utilization device comprises frequency-sensing means responsive to the speed-representing signal to produce a control signal for automatically controlling the speed of the mechanism. The controlled oscillator circuit serves to supply the frequency-sensing means with speed-representing signals during normal operation, and should the alternating signal fail it produces a higher-frequency signal causing the mechanism speed to fall to a low, safe, value.

More particularly, in a speed control system of the type in which an alternating signal indicative of speed of operation of an engine mechanism is derived and in which frequency-sensing means responsive to the alternating signal produce a control signal for automatically controlling the speed of the engine, a controlled oscillator circuit is positioned between the source of the alternating signal and the input to the frequency-sensing means and operates as a free-running oscillator when the alternating signal is absent or below a predetermined threshold magnitude, but responds to the alternating signal when it is of greater than said threshold magnitude to produce shaped output signals of exactly the same frequency as the alternating signal. Preferably the free-running frequency of the oscillator circuit is higher than the highest frequency of the alternating signal. Accordingly, should the alternating signal fail, the oscillator circuit will continue to provide output signals for operating the speed control system, and will provide them at a higher-than-normal rate so as to slow down the engine and preferably to shut it down completely. In this way the oscillator circuit not only provides "fail safe" operation with respect to possible failure of the speed-representing alternating signal, but also produces the desired accurately-shaped wave form desired for proper operation of the frequency sensor.

The controlled oscillator of the invention comprises an oscillator for producing free-running oscillations at a predetermined frequency, and means responsive to a varying control signal of a frequency lower than said predetermined frequency for inhibiting said free-running oscillations and causing said oscillator to produce output signals at said lower frequency.

In its preferred form, the controlled oscillator circuit comprises an amplifying device having a negative feedback circuit and a positive feedback circuit providing two opposite astable saturation states for the amplifying device between which it alternates during its free-running condition, and between which it switches very rapidly. When the alternating signal input to the oscillator circuit is present in sufficient magnitude, each half cycle of the alternating signal causes the oscillator to remain in a particular one of its saturated states for the duration of one-half cycle of the alternating signal. This not only results in the production of the desired square wave at the frequency of the alternating signal, but does so in a manner which provides substantial noise rejection capabilities. Also, in its preferred form there is a smooth transition in oscillator frequency from its higher, free-running value to its lower, controlled value as the input alternating signal increases from below to above said threshold magnitude, a feature which is useful in some applications.

In one preferred embodiment of the invention, the amplifying device comprises an operational amplifier of the differential-input type having a non-inverting and an inverting input terminal, the negative feedback path comprising resistance means connected between the output of the operational amplifier and the inverting input terminal thereof together with capacitive means effectively in shunt with the inverting input terminal, while the positive feedback path comprises the series combination of resistance means and capacitive means connected between the output terminal of the operational amplifier and the non-inverting input terminal thereof. The positive feedback path provides positive feedback which is initially stronger than the negative feedback upon the occurrence of a change in amplifier output voltage, thereby producing a transition in output voltage, but the positive feedback decays after each such transition until the negative feedback predominates, after which an opposite transition occurs.

The controlled oscillator circuit of the invention therefore provides within itself, in simple and inexpensive form, an arrangement which not only provides the pulse shaping and noise rejection features desired in such a circuit, but also provides "fail-safe" operation by its free-running capability in the absence of an adequate magnitude of input alternating signal thereto.

BRIEF DESCRIPTION OF FIGURES

Other objects and features of the invention will be more fully understood from a consideration of the following detailed description, taken in connection with the accompanying drawings, in which.

DESCRIPTION OF SPECIFIC EMBODIMENTS

Figure 1:
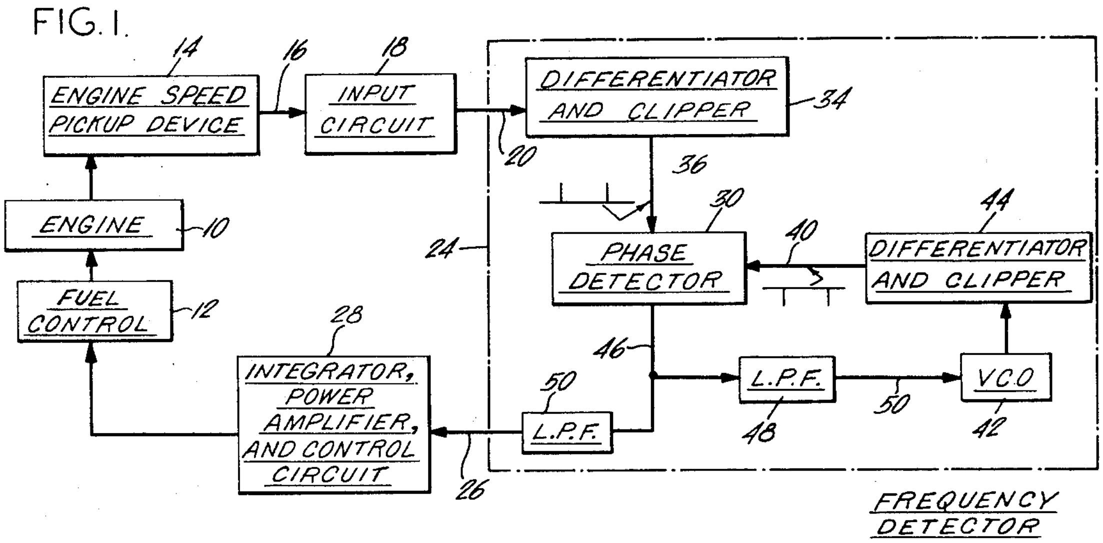
FIG. 1 is a schematic block diagram illustrating a system in which the invention is useful.

Referring first to the block diagram of FIG. 1, there is shown therein an engine speed governing system to which the invention is applicable. In this example an engine 10, which may be a diesel engine, is provided with a conventional fuel control 12, which may for example comprise a rotary solenoid actuator secured to the fuel control lever of the engine, as described and claimed, for example, in U.S. Pat. No. 3,435,395 of M.I. Rosenberg et al. issued Mar. 25, 1969. The system operates automatically to vary the fuel control 12 in such manner as to maintain the engine speed 10 at a desired constant value despite such factors as changes in load on the al., engine. To accomplish this there is employed an engine-speed pickup device 14 suitably coupled to a moving part of the engine for deriving an alternating signal having a frequency which varies in proportion to the speed of the engine. Such devices are well known in the art, and typically comprise an element of magnetic material such as steel secured to a rotating component of the engine, such as a gear on the flywheel or camshaft, and a pickup coil and magnet assembly positioned adjacent the magnetic element so that an alternating electrical current is induced therein by the rotary motion of the magnetic element. The latter alternating signal is supplied over line 16 to the input circuit 18 constructed in accordance with the invention in the manner which will be described in detail in connection with FIG. 3. Input circuit 18 produces a square wave on line 20 which, in the presence of a sufficient magnitude of the input alternating signal on line 16, is at the same frequency as said alternating signal, and which, if the alternating signal falls below a predetermined level, is at a higher frequency.

The square-wave signal from input circuit 18 is applied to the frequency detector 24 shown within the broken-line rectangle, which serves to provide on line 26 a voltage or current which varies with the frequency of the square waves. The latter signal is applied to the integrator, power amplifier an control circuit 28 wherein it may be amplified and converted to a suitable form for effecting the desired automatic operation of fuel control 12, so as to permit the engine to come up to the desired speed when it is first turned on and to maintain it automatically at this speed thereafter. Preferably fuel control 12 is of the type which is normally spring-biased to the position for minimum fuel supply, and it moved to its maximum fuel position as the engine is cranked, started and accelerated, and is backed off from this position as the engine comes up to the desired speed by the signals from the power amplifier and control circuit 28, the fuel control 12 being thereafter varied in one direction or the other as required to maintain the desired engine speed.

The frequency detector 24 in this example is of a type utilizing a phase detector 30 in a phase-locked loop. More particularly, the square wave on line 20 is applied to a differentiator and clipper 34 which operates to produce on line 36 a narrow pulse coincident in time with one of the edges of the square waves produced by input circuit 18, for example the positive going edge thereof. Phase detector 30 is also supplied over lead 40 with short pulses coincident in time with the edges of a square wave generated by a voltage controlled oscillator through a differentiator and clipper circuit 44, the polarity of the clipping action preferably being such that the pulses in line 40 are of opposite polarity from those on line 36.

Frequency detector 24 then serves to produce a varying DC voltage at its output lead 26 which varies in dependence upon the relative phases of the narrow pulses applied to the phase detector over lines 36 and 40. The pulses of varying width on line 46 are supplied to a low-pass filter 48 to produce on output line 50 thereof an input control voltage for the voltage controlled oscillator 42. The polarities of the signals in the phase detector loop are such that when the frequency of recurrence of the pulses on line 36 changes, the resultant change of voltage on line 50 is of the sense to change the frequency of the voltage controlled oscillator in the direction to oppose increases in phase differences between the pulses on lines 36 and 40, thereby causing the voltage controlled oscillator to follow the frequency of the alternating input signal on line 16. The widths of the pulses on line 46 vary in dependence upon the frequency of the input signals on line 36 and, after these pulses have passed through the low-pass filter 50, the resultant slowly-varying voltage on line 26 properly represents the frequency of the input alternating signal on line 16.

While the phase-locked-loop frequency detector 24 may be of entirely conventional form, preferably it is of the form described and claimed in my co-pending application Ser. No. 171,629, filed Aug. 13, 1971, and entitled "Electric Speed Control System and More-Than-Two-State Phase Detector Suitable For Use Therein," which utilizes a more-than-two-state phase detector arrangement for frequency sensing, and is hereby included by reference.

It is understood that the power amplifier and control circuit 28 may include any of various known arrangements for enhancing and optimizing the operation of the servo feed-back loop, as well as appropriate circuits for producing so-called "dither" of the fuel control lever for the engine so that it is constantly in motion and has an average position proper for producing the desired quantity of fuel supply.

As pointed out hereinbefore, the input circuit 18, according to the prior art, may comprise a conventional signal clipping or limiting arrangement for squaring the alternating signal supplied thereto over line 16. However, with such a circuit, if the signal on line 16 should fail there will be no signal on line 36 to the phase detector 30, and the phase detector output on line 46 will be a single DC value permitting the fuel control 12 to be in its maximum fuel state and to remain so, whereby the engine 10 will be speeded up to its maximum condition and a runaway condition will ensue. Even if the alternating signal at 16 does not disappear completely and permanently but merely become sufficiently small that, in effect, it disappears at times, particularly in the presence of noise or other interference, the operation of the system will tend toward overspeed.

Accordingly, in accordance with the invention the input circuit 18 is constructed so that when the latter signal disappears or falls below a predetermined threshold level, the oscillator reverts to its free-running state, in which it produces a square-wave output at a higher frequency than the maximum governed frequency of the alternating signal on lead 16. Such high-frequency square waves from input circuit 18 simulate the condition of a very high engine speed, and act through the frequency detector in the sense to reduce the fuel supply, and preferably to shut down the engine completely under such conditions.

Figures 2A, 2B, 2C:
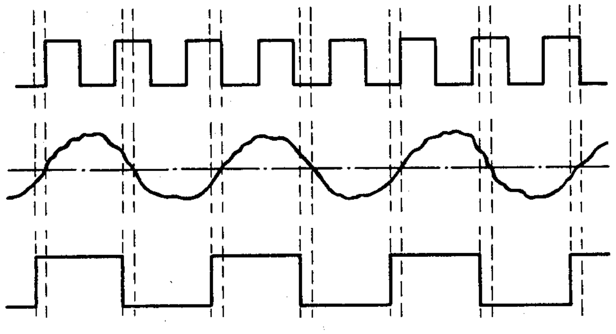
FIGS. 2*a*, 2*b* and 2*c* are graphical representations to the same time scale, to which reference will be made in explaining the operation of the invention.

Referring now to FIG. 2*a*, there is shown therein a square wave (a term utilized herein to designate that the two half-cycles of each complete cycle of operation are equal in time duration) recurring at a relatively high frequency, such as will be produced when the input circuit 18 is constructed in accordance with the preferred form of the invention and the alternating signal 16 is absent or below a threshold value. FIG. 2*b* represents the input signal at line 16, and is roughly sinusoidal in form, although it typically contains irregularities in general form from cycle-to-cycle and substantial higher-frequency irregularities due to noise occurring within each cycle. FIG. 2c illustrates the square wave output from input circuit 18 produced when the input signal at 2b is present in adequate magnitude. The duration of each half-cycle of the square wave of FIG. 2c is equal to the duration of a half-cycle of the input alternating signal shown at 2b, and accordingly during normal operation the desired accurate, sharply-delineated square wave at the frequency of the alternating signal is delivered to the frequency detector as desired. Again, when the alternating signal disappears or falls below a predetermined threshold level, the output of the input circuit 18 will revert to the higher-frequency square-wave signal shown in FIG. 2a to provide the "fail-safe" operation described above.

Figure 3:
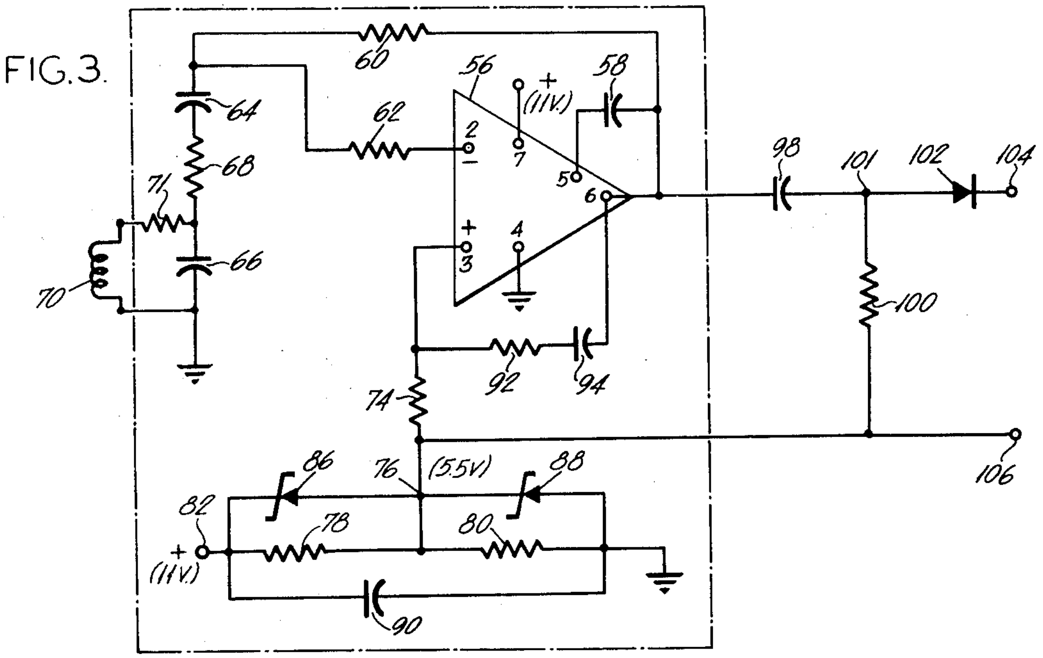
FIG. 3 is an electrical schematic diagram illustrating a controlled oscillator circuit in accordance with the invention, and useful in the system of FIG. 1.

Referring now to FIG. 3, there is shown therein a preferred embodiment for the input circuit 18, of FIG. 1, constructed in accordance with the invention. The circuit comprises a differential-input type of operational amplifier 56 of the type having an output terminal 6, an inverting input terminal 2 responsive to input signals applied thereto to produce at output terminal 6 an output signal component of opposite phase, and having a non-inverting input terminal 3 responsive to input signals thereto to produce at output terminal 6 an output signal component which is in phase with the input signal at terminal 3. Such differential amplifying devices are well known in the art and need not be described in detail. By way of example only, the operational amplifier may be a high-gain integrated-circuit type SN52709L, manufactured by Texas Instrument Company. Positive supply potential (e.g. 11 volts) for the amplifier is applied to terminal 7 thereof, and an ordinary conventional output compensation capacitor 58 may be connected between terminals 5 and 6 thereof in known manner, input compensation being unnecessary in this circuit.

A negative feedback circuit is provided by the series combination of resistors 60 and 62 connected in series between amplifier output terminal 6 and the inverting input terminal 2, together with a shunt network made up of capacitors 64 and 66 connected between the tap point joining resistor 60 and 62 and a point at reference potential designated as ground, and a resistor 68 connected between the two capacitors. Coil 70 represents the coil of an inductive pickup device; in this example it is assumed to represent the output element of the engine speed pickup device 14 of FIG. 1. Accordingly, the alternating signal developed in coil 70 is applied by way of a series input resistor 71, resistor 68, capacitor 64, and resistor 62 to the inverting input terminal of the operational amplifier.

Input resistor 71 acting with capacitor 66 forms a low-pass filter and integrator which passes the frequencies of alternating signal from pickup device 14, typically from 300 to 10,000 Hz, and rejects other frequencies including most noise frequency components. Resistors 60 and 68 form the fast part of the negative feedback voltage divider that, combined with the positive feedback, determines the free-running frequency of the circuit. Capacitor 64 provides D.C. blocking, and assures that the duty cycle of the output square wave is near 50 percent, while resistor 62 provides protection against very large input signal voltages.

The non-inverting input terminal 3 of the amplifier is supplied with appropriate bias through resistor 74 from a tap point 76 between the two divider resistor 78 and 80, the two divider resistors being connected between a positive bias terminal 82 (which may for example be at 11 volts) and a source of reference potential designated as ground. The divider resistors 78 and 80 are shunted, respectively, by zener diodes 86 and 88 which, together with the large-valued bypass capacitor 90 shunted across the complete divider, provide a regulated smooth bias voltage at tap point 74.

A relatively short time-constant positive feedback circuit is provided between amplifier output terminal 6 and non-inverting input terminal 3 by a series arrangement of capacitor 94 and the voltage divider made up of resistors 92 and 74. The value of capacitor 94 is sufficiently small to discharge much faster than the voltage across capacitors 64 and 66.

Amplifier output terminal 6 is supplied to the combination of series capacitor 98 and shunt resistor 100, serving together as a differentiator; the junction point 101 between capacitor 98 and resistor 100 is connected to a clipper diode 102. The latter differentiator and clipper corresponds to the block 34 in FIG. 1. The output between terminals 104 and 106 is therefore composed of the very short positive pulses described above as appearing on line 36 in FIG. 1.

In the operation of the circuit of FIG. 3 in the absence of alternating signal from coil 70, were it not for the positive feedback elements 92 and 94 the negative feedback path would hold the voltage at output terminal 6 and that at inverting input terminal 2 at about one-half the supply voltage, e.g. about 5.5 volts. However, the positive feedback circuit renders the amplifier unstable under such conditions, and any small perturbation which causes the voltage at output terminal 6 to change in either direction will cause a regenerative feedback action through the positive feedback path, to continue and accelerate this direction of change until the amplifier reaches one of its two opposite saturation states in which the overall loop gain falls to 1 and the voltage stabilizes at least momentarily. In this example, one extreme saturated condition or state of the amplifier will occur when the output voltage at terminal 6 is substantially equal to the supply voltage, here assumed to be 11 volts, and the other extreme saturated state will exist when the output terminal voltage is about zero, or ground potential. When either of these saturated states is reached, there is no longer a rate of change of output voltage and hence no voltage changes are fed back to the non-inverting input terminal 3. The positive feedback capacitor 94 then discharges rapidly through resistors 92 and 74, the discharge time constant being typically very short, e.g. about 6 microseconds, until the positive feedback voltage has fallen to the negative feedback voltage at terminal 2. The negative feedback circuit then acts in the sense to move the amplifier out of its saturated condition toward a more central state, and as soon as this happens the resultant rate of change of voltage at output terminal 6 acts regeneratively through the positive feedback circuit to drive the amplifier to its opposite saturated state. It is noted that, because of the use of the capacitors 64 and 66 effectively in shunt with the negative feedback path, which capacitors together with the feedback resistors produce time constants many orders of magnitude longer than that for the positive feedback path, the negative feedback voltage developed across resistor 68 is insufficient to inhibit the positive feedback during transitions between saturation states, and is only effective to move the amplifier out of saturation after it has been driven into such a state by the positive feedback circuit.

Accordingly, under these free-running conditions the amplifier is driven back and forth between its two alternate saturation states, with very sharp transitions between the states because of the regenerative action of the positive feedback circuit. The result is that the output voltage at terminal 6 comprises pulses with the desired steeply rising and falling edges. The time constants as determined by the values of the resistors and capacitors employed are preferably set so that the frequency, or repetition rate, of these pulses is higher than the highest frequency of the alternating signal to be supplied thereto from the engine speed pickup device, 12,000 Hz being typical.

It is further noted that the pulse form produced will be of the square wave type, i.e., it will have about a 50 percent duty cycle, the two half-cycles during each cycle being substantially equal in duration. This will be appreciated from the fact that the voltage at non-inverting input terminal 3 averages 5.5 volts; the average voltage at terminal 2 must be approximately equal to the terminal 3 voltage for the circuit to switch; and the average voltage at terminal 2 is equal to that at terminal 6. This means that the voltage at output terminal 6 must also average about 5.5 volts. Since the latter voltage is actually swinging between about 0 and 11 volts as its opposite saturation states, the fact that it must average about 5.5 volts means that it must be in each of its two states approximately one-half of the time, resulting in a square-wave configuration, with half-cycles of equal duration.

In summary, in the absence of input alternating signal from coil 70, the circuit shown will produce a square wave at output terminal 6, which is at a frequency higher than the maximum frequency of the alternating signal. When the alternating signal from coil 70 is present in adequate magnitude, this signal overcomes the tendency of the circuit to oscillate, forcing it to switch in synchronism with the input signal so that the output voltage of terminal 6 is then a square wave at the same frequency as the input alternating signal. The circuit still produces the desired sharp pulse edges due to the regeneration provided by the positive feedback circuit, which sharp edges provide the desired accurately-phased differentiated pulses, and the regeneration also serves to prevent noise from triggering the circuit in the opposite direction from the direction of the transition occurring.

FIG. 2B represents the input alternating signal supplied from coil 70, which has a frequency lower than that of the frequency of the oscillator when free running. FIG. 2C shows the resultant output voltage at terminal 6, which is a square wave having half cycles equal in duration to the corresponding half cycles of the input alternating signal of FIG. 2B. As will be seen from these figures, the amplifier will be held in either of its saturation states by a given half cycle of the input alternating wave until the latter signal falls sufficiently close to zero to permit the regenerative action to occur driving the amplifier to its opposite state. While this regenerative switching to the opposite state may occur slightly before the time when the alternating input signal is zero, the durations of the half cycles of the resultant output square wave are the same as the durations of the half cycles of the alternating input signal.

As explained previously, the square wave of FIG. 2C is supplied to frequency detector circuit and accomplishes engine-speed governing in the usual way, and when the input alternating signal disappears or falls to very small value, the oscillator reverts to the free-running condition shown in FIG. 2A, which is at a substantially higher frequency than the maximum frequency of the input alternating signal and causes the governor feedback system to shut down the engine and prevent erratic or runaway conditions.

Without thereby limiting the scope of the invention, the following example of circuit values and conditions suitable for use in practicing the invention in one form is provided:

| | | |
|---|---|---|
| Resistor **71** | 5,100 | ohms |
| Resistor **68** | 510 | " |
| Resistor **62** | 220,000 | 37 |
| Resistor **60** | 510,000 | " |
| Resistor **74** | 10,000 | " |
| Resistor **92** | 47,000 | " |
| Resistors **78** and **80** | 4,700 | " |
| Resistor **100** | 2,200 | " |
| Capacitors **66** and **64** | | each 0.1 microfarad |
| Capacitor **58** | 15 | micro microfarads |
| Capacitor **94** | 100 | micro microfarads |
| Capacitor **98** | 0.0047 | microfarad |
| Capacitor **90** | 0.47 | microfarad |
| Supply Voltage + 11 volts | | |

It will be understood that a variety of forms for the details of the positive and negative feedback circuits may be employed, so long as the positive feedback circuit provides initial regeneration upon a change of voltage at the output terminal 6 to produce a complete transition to one saturated stable state, and subsequently the voltage provided by a negative feedback path exceeds the positive feedback voltage then remaining, at which time regeneration in the opposite direction occurs to place the circuit in its other saturated stable state. It will also be understood that the input alternating signal need not be applied to the inverting input terminal, but may be applied to the non-inverting input terminal or to both the inverting and non-inverting input terminals.

While the invention has been described with particular reference to specific embodiments thereof in the interest of complete definiteness, it will be understood that it may be embodied in a variety of forms diverse from those specifically shown and described without departing from the spirit and scope of the invention as defined by the appended claims.

What is claimed is:

1. In an engine speed control system comprising means responsive to operation of said engine for producing an alternating signal having a frequency proportional to the speed of operation of said engine, frequency-sensing means responsive to an input signal thereto for producing a control signal which changes in one direction when the frequency of said input signal increases and in the opposite direction when said frequency of said input signal decreases, means responsive to said alternating signal for supplying input signal to said frequency-sensing means, engine power control means for said engine, and electrical means responsive to said control signal for operating said engine power control means to control the speed of said engine and to hold said speed within a predetermined range, said system being such as to permit the speed of said engine to change uncontrolledly if the magnitude of said input signal to said frequency-sensing means becomes smaller than a predetermined value, the improvement wherein:

said means responsive to said alternating signal for supplying input signal to said frequency-sensing means comprising an oscillator circuit having control terminals supplied with said alternating signal; said oscillator circuit operating, when said alternating signal is of less than a predetermined level, as a free-running oscillator to supply said input signal to said frequency-sensing means at a frequency higher than the maximum frequency of said alternating signal, but controlled by said alternating signal when it is above said predetermined level to supply said input signal to said frequency-sensing means at the same frequency as said alternating signal, whereby said engine speed is prevented from changing uncontrolledly when said alternating signal is of less than said predetermined level.

2. Apparatus according to claim 1, in which said system is responsive to said higher frequency of said oscillator circuit, produced when it is free-running, to reduce said engine power to a low value.

3. Apparatus in accordance with claim 2, in which said system is responsive to the absence of said input signal to increase said engine speed uncontrolledly.

4. Apparatus according to claim 1, in which said oscillator circuit is operative to produce a substantially square wave both when free-running and when controlled by said alternating signal.

5. Apparatus in accordance with claim 4, in which said oscillator circuit comprises an amplifying device, a relatively-longer time constant negative feedback circuit, and a relatively-shorter time constant positive feedback circuit for said amplifying device, to provide two alternate stable states therefor; said alternating signal being applied to the input terminals of said amplifying device to maintain said device alternately in one of said states for a time equal to the duration of one half-cycle of said alternating signal and then in the other of said states for a time equal to the duration of one half-cycle of said alternating signal.

6. Apparatus in accordance with claim 5, in which said amplifying device is an operational amplifier having a pair of differential input terminals, said alternating signal being applied to the inverting input terminal of said device, said positive feedback circuit being connected between the output terminal of said operational amplifier and the non-inverting input terminal thereof, said negative feedback circuit being connected between said output terminal and said inverting input terminal.

7. Apparatus in accordance with claim 6, in which said positive feedback circuit comprises the series combination of resistor means and capacitor means.

8. Apparatus in accordance with claim 6, in which said negative feedback path comprises first and second resistance means connected in series between said output terminal and said inverting input terminal, and capacitive means connected effectively in parallel across said input terminals.

9. In an engine speed control system comprising means responsive to operation of said engine for producing an alternating signal having a frequency proportional to the speed of operation of said engine, frequency-sensing means responsive to an input signal thereto for producing a control signal which changes in one direction when the frequency of said input signal increases and in the opposite direction when said frequency of said input signal decreases, means responsive to said alternating signal for supplying input signal to said frequency-sensing means, engine power control means for said engine, and electrical means responsive to said control signal for operating said engine power control means to control the speed of said engine, said system being such as to permit the speed of said engine to change uncontrolledly if the magnitude of said input signal to said frequency-sensing means becomes smaller than a predetermined value, the improvement wherein:

said means responsive to said alternating signal for supplying input signal to said frequency-sensing means comprises an oscillator circuit having control terminals supplied with said alternating signal; said oscillator circuit operating, when said alternating signal is of less than a predetermined level, as a free-running oscillator to supply said input signal to said frequency-sensing means at a frequency higher than the maximum frequency of said alternating signal, but controlled by said alternating signal when it is above said predetermined level to supply said input signal to said frequency-sensing means at the same frequency as said alternating signal, whereby said engine speed is prevented from changing uncontrolledly when said alternating signal is of less than said predetermined level.

* * * * *